United States Patent [19]

Cannon et al.

[11] 3,792,619

[45] Feb. 19, 1974

[54] CONSTANT TENSION BALL SCREW FEED DESIGN

[75] Inventors: Robert E. Cannon, Box 629, Hibbing, Minn. 55746; Walter L. Pehoski, St. Paul, Minn.

[73] Assignee: said Cannon, by said Pehoski

[22] Filed: Aug. 31, 1972

[21] Appl. No.: 285,531

[52] U.S. Cl.............................. 74/89.15, 308/228
[51] Int. Cl............................................ F16h 27/02
[58] Field of Search..... 74/89.15, 424.8 R; 308/228, 308/216

[56] References Cited
UNITED STATES PATENTS

| | | | |
|---|---|---|---|
| 2,655,340 | 10/1953 | Dalton | 74/424.8 |
| 2,663,542 | 12/1953 | Lincoln et al. | 74/424.8 |
| 3,398,484 | 8/1968 | Katsumura et al. | 74/89.15 |
| 2,680,659 | 6/1954 | Morrison et al. | 308/228 |
| 2,705,395 | 4/1955 | Navarre | 308/228 |

Primary Examiner—Benjamin W. Wyche
Assistant Examiner—Wesley S. Ratliff, Jr.
Attorney, Agent, or Firm—Schroeder, Siegfried, Ryan and Vidas

[57] ABSTRACT

The invention herein is directed to a constant tension arrangement for a lead or ball screw drive for the purpose of preventing compressive forces from acting on an elongated ball screw or lead screw member to deform the same. The constant tension arrangement is provided by means of a bearing mounting in which thrust bearings are positioned on the ends of the screw member in such a manner that axial displacement in the direction of the support for the screw member is permitted. With this arrangement, and for either direction of motion of the driven nut thereon, any loading will effect a constant tension force on the ball or lead screw member opposite that of the loading permitting the remainder of the screw member to move axially and prevent compressive loading of the same.

11 Claims, 5 Drawing Figures

PATENTED FEB 19 1974
3,792,619
SHEET 1 OF 2
FIG. 1.
FIG. 2.
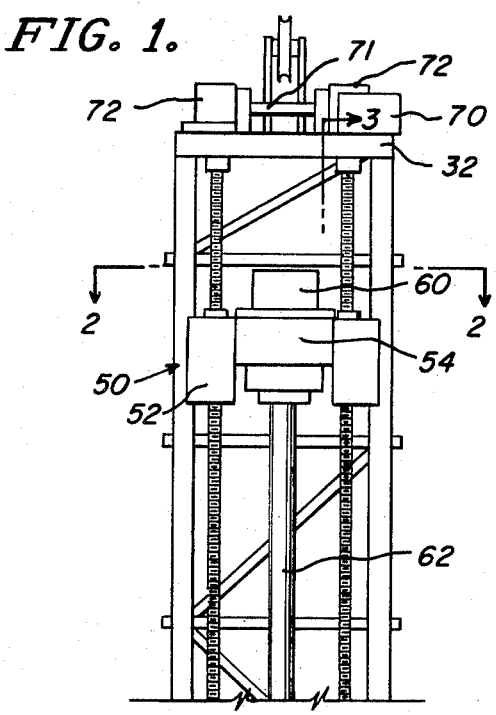
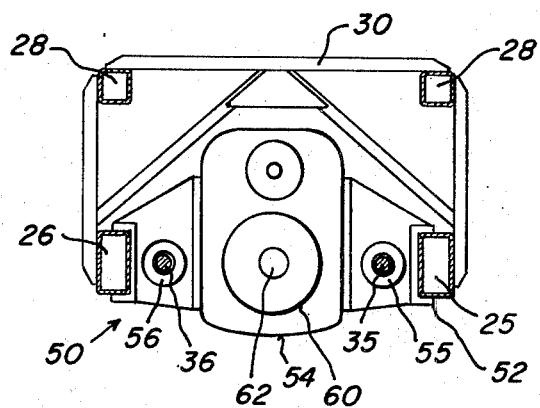
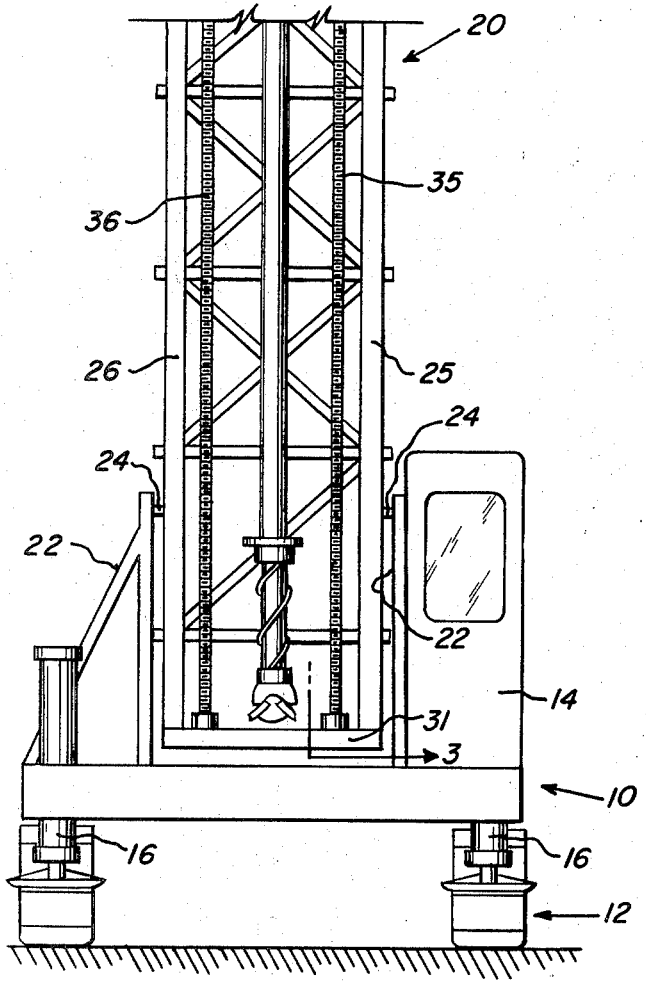

PATENTED FEB 19 1974 3,792,619

CONSTANT TENSION BALL SCREW FEED DESIGN

Our invention relates to a ball screw or lead screw feed design and more particularly to an improved bearing construction for mounting the lead or ball screw to provide for the application of constant tension on the same for either direction of motion and loading.

In the past, load bearing members such as lead screws have been prestressed by means of external means, such as by applying a separate hydraulic force thereto, for the purpose of damping vibrations and flutter and increasing precision of operation. Further, load bearing lead screws of long lengths required larger sized screws to withstand the loading.

The present invention is directed to an arrangement by means of which the mounting of the lead screw itself through suitable bearings and the arrangement of the same brings about an application of tension to the lead screw under load for either direction of movement to minimize vibrations and to prevent translational displacement of the same. This is particularly true when the lead screw or ball screws are of increased length and under normal construction would be placed in compression with loading due to the drive of the same. This improved lead screw mounting arrangement permits a size reduction from that of the conventional mounting for the same load requirements.

It is therefore the principal object of this invention to provide an improved lead or ball screw feed design and mounting arrangement in which the screw member is placed under constant tension for all loadings and directions of motions.

Another object of this invention is to provide a simplified structure in the form of the mounting of the lead screw through mechanical journaling means to insure the application of a tension force thereon for all directions of motion.

A further object of this invention is to provide a lead screw mounting arrangement that permits a reduction in the cost of the lead screw because of size reduction.

These and other objects of this invention will become apparent from a reading of the attached description together with the drawings wherein:

FIG. 1 is a front elevation view of a drilling apparatus showing the application of the invention to lead or ball screws for driving the drilling head;

FIG. 2 is a sectional view taken along the lines 2—2 of FIG. 1;

Figure 3:
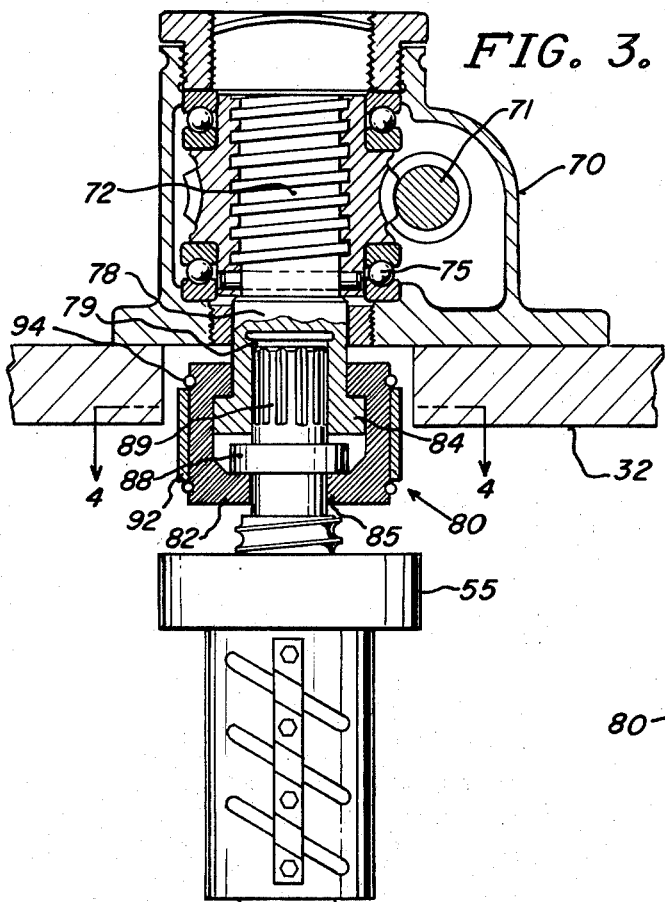
FIG. 3 is a sectional view of FIG. 1 taken along the lines 3—3 therein showing the lead screw and its journal bearing mounting.

Our invention in a ball screw or lead screw feed design is shown in the drawings in connection with a drilling rig or structure, the details of which are omitted for simplicity. Thus in FIG. 1, the drill rig which is shown in front elevation is comprised of a base frame 10 having a suitable track or motive drive structure 12 beneath the same with appropriate engines and power supplies (not shown) to provide a hydraulic fluid source for operating equipment on the rig. A suitable cab structure 14 is included on the base frame wherein the operator of the drilling apparatus may suitably control the various controls (not shown) which operate the motive drill structure, the power supplies and the controls for the motors on the drilling rigs. Included on the base frame are stabilizing support members 16 which are hydraulically operated to support the head frame 20 when it is elevated. Journaled on upstanding flange structures 22 of the base frame is the elongated head frame 20, the head frame being supported through suitable pivot means 24 and being elevated between a horizontal and an inclined or vertical position through suitable hydraulic actuators (not shown).

The head frame is comprised of a mast structure including a pair of guide masts 25, 26 and rear supporting masts 28 which are suitably interconnected through cross bracing 30 with a bottom and top support member 31, 32, respectively. Positioned between the top and bottom support members of the head frame and extending parallel to the guide masts 25, 26 are a pair of elongated ball screw members or drive screws 35, 36 which are suitably journaled in the bottom and top supports or members 31, 32 of the head frame through suitable means to be hereinafter identified. The ball screws or lead screws mount a drill head structure, indicated generally at 50, which include guide members 52 and a drill head frame 54 with the cooperating ball nut structures indicated at 55, 56 mounted in the drill head frame 54. The drill head frame includes the rotary drill power assembly, indicated generally at 60, which mounts in turn the drill rod 62 and the entire assembly is advanced up and down the head frame being guided thereon by means of the guide members 52 on the drill head frame 54 which bear against the guide masts 25, 26. The drill power assembly may be mounted on the top or bottom of the drill head frame, as desired. The screw members 35, 36 are rotated, as will be hereinafter identified, and the ball nut structures include conventional balls which ride in the grooves of the screws with rotation of the same to advance the drill head up and down the head frame. At the top of the head frame or bottom, if desired, is mounted the synchronizing drive assembly 70 for the ball screw members, the drive assembly including gearing heads 72 with an interconnecting shaft 74 operating from the drive assembly to insure synchronization of the ball screw members 35, 36 in the operation of the drill head assembly or the movement of the same. Although not shown, it will be understood that the hydraulic fluid lines extend along the head frame 20 to the synchronizing screw drive assembly 70 and through flexible hoses to the rotary drill power assembly 60 on the drill head. The drill head assembly 60 and synchronizing drive may be powered hydraulically, electrically or pneumatically, as desired.

The details of the drilling apparatus are shown herein only schematic since this is one application of the invention which involves the mounting of the ball screws or lead screws in an apparatus wherein the screw members are elongated and subject to loading which could apply distorting forces to the elongated screw members if they were mounted for compression during loading. Thus, the invention herein relates to the particular mounting of the screw members and journaling of the same, as will be hereinafter identified, and this principle could be applied to structures other than drilling apparatus. For this reason, the drilling apparatus is shown only schematically for the purpose of explaining the application of the invention.

Figure 4:
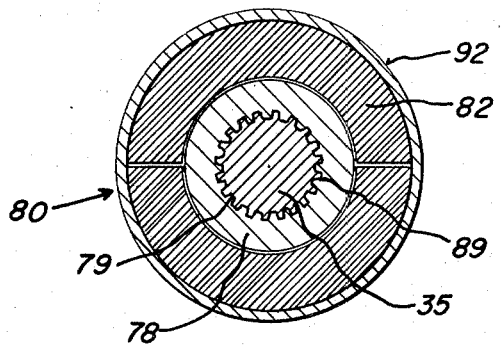
FIG. 4 is a sectional view taken along the lines 4—4 of FIG. 3.

In the sectional view of FIG. 3, one of the screw members 35 is shown together with its mounting on the head frame and the associated drive structure for the screw member. Thus as will be seen in FIG. 3, the screw drive motive means is indicated generally at 70 with the drive shaft 71 operating through gearing 72 which is mounted on the upper head brace or support 32 of the head frame 20. In the embodiment shown, the screw member 35 is journaled in the upper end of the head frame through thrust bearings indicated at 75 and included as part of the gearing 72. An internal splined drive shaft 78 having an internal splined surface 79 is connected to the gearing and is coupled to the screw member through a coupling structure indicated generally at 80. This includes a split transfer thrust collar 82 which fits around a flange extension 84 on the drive shaft 78. The transfer thrust collar 82 which is formed in two parts defines an annular shoulder portion 85 which fits around a circular or cylindrical flange portion 88 on one end of the screw member 35. Beyond the surface of the cylindrical shoulder or flange 88 is an external splined surface 89 which couples the screw member to the splined surface 79 of the drive shaft for imparting rotative movement thereto. As will be seen in the drawings, longitudinal clearance is provided between the splined surfaces and the cylindrical flanges 84 and 88 to permit axial movement between the drive shaft and the screw member. The split transfer thrust collar is held in assembled relationship (see FIG. 4) by means of a circular retaining collar 92 which fits around the same, with the retaining collar being held in position by means of snap rings 94 fitted into grooves in the external surface of the thrust collar. In FIG. 3, only the ball nut portion 55 of the drill head is shown to indicate the loading on the screw member. As will be recognized, the screw member and nut may be of a conventional construction and the application of the same may be other than in a drilling apparatus wherein loading of some part carried by the nut will effect forces on the screw member as the same is rotated to advance the nut member along the extent of the screw member.

Figure 5:
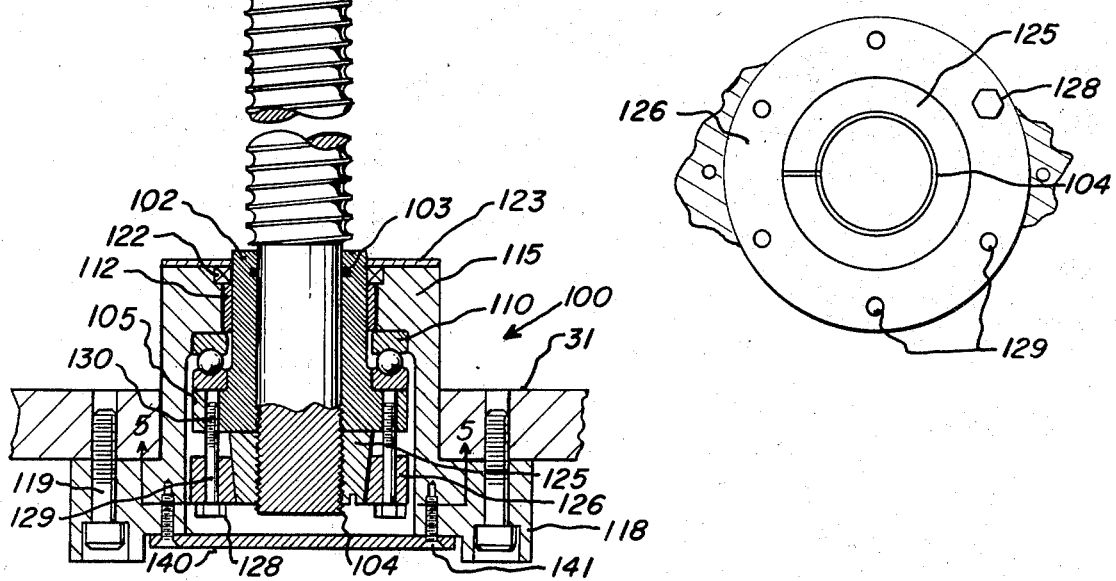
FIG. 5 is a sectional view of FIG. 3 taken along the lines 5—5 therein.

The lower or opposite end of the screw member is journaled in the lower brace or support 31 of the head frame 20. This mounting structure is shown generally at 100 and includes a bearing retainer 102 mounted on the opposite shaft extremity of the screw member 35. The bearing retainer includes a suitable O-ring type seal 103 positioned in the suitable groove therein and bearing against the cylindrical end of the screw member which as will be later noted, is preferably tapered toward its outer extremity and includes a threaded extension 104. The sliding bearing retainer has a cylindrical flange section 105 which bears against the movable race of an annular thrust bearing 110 mounting this end of the screw member in the support 31. A suitable sleeve type bushing or journal 112 is positioned around the bearing retainer 102 and slidably mounts the same in a cylindrical mounting member 115, the mounting member having an annular flange portion 118 through which screw members or bolts 119 extend to bolt the same to the lower support 31. A suitable oil seal 112 and cover plate 123 is positioned around the bearing retainer 102 and fitted into the flange 115 adjacent the sleeve bearing or journal 112 to seal the same. The fixed race of the thrust bearing 110 is also mounted in a shoulder portion of the support 115 such that the races of the thrust bearings 110 are positioned between the bearing retainer 102 and the support member 115 for journaling the lower end of the screw member for rotative movement with the journal member 112 permitting axial or longitudinal movement, as will be hereinafter noted. The bearing retainer 102 is forced against the movable race of the thrust bearing 110 by means of a split taper nut 125 which threads on the tapered threaded extremity 104 of the screw member and preloads or takes up slack in the thrust bearing (see FIGS. 3 and 5). The taper lock collar 126 is fitted over the split taper nut and suitable bolt members 128 are positioned through apertures 129 in the taper collar lock are threaded into tapped apertures 130 in the bearing retainer to lock the nut in position after taking out slack or preloading of the bearings. A cap 140 is positioned over the open end or recessed end of the support member 115 in which the flange portion 105 of the bearing retainer, the thrust bearings and the lock nut are positioned for the purpose of covering or enclosing the same to prevent the entrance of dirt thereto. This is secured to the flange portion 118 of the support member by suitable means such as screws 141. With this mounting of the screw member 35 at the lower extremity of the same, the thrust bearings grip the screen member from the side remote from the end of the screw member and the journal or sleeve bearing 112 allows for movement of the screw member axially toward the support effectively decreasing any preloading of the thrust bearings, but limits movement of the screw member in the opposite direction. Thus, the thrust bearings are gripped from the back and the screw member will not be placed in compression in its mounting in the lower support member. The same effect is produced by the coupling member 80 connecting the drive shaft 78 to the other end of the screw member 35 since the coupling member will grip the shaft slightly remote from the upper end of the screw member but will allow movement of the screw member toward the drive shaft while preventing movement of the screw member beyond the engagement of the flange 85 on the screw member with the flanges 84 on the drive shaft and the flange portion 85 on the coupling member.

With this particular mounting of the screw member, operation of the ball nut drive is caused by rotation of the screw member 35 to advance the nut up and down the extent of the screw member. This will effect a loading on the nut and the screw member whenever the nut is connected to some means providing a reactive force thereto. In the case of the drill structure as shown in FIGS. 1 and 2, the drilling head in the head frame is advanced downwardly in a conventional drilling operation and upwardly in a retractive mode of operation to recover drill bits or in a driving operation for back reaming to place a load on the individual nuts 55, 56 mounted on the screw members 35, 36 and carrying the drilling head assembly. Thus in a conventional drilling operation, as the drill head is moved downwardly and the drill stem is rotated through its drive motor 60, resistance of the drill rod is supplied back through the drill head to provide an upward force on the nuts 55, 56. In FIG. 3, this upward thrust or resistance is applied to the nuts 55, 56 as the screw members 35, 36 are rotated by their drive structure in advancing the drill head downwardly which will cause the screw members to be placed in tension due to the action of the bearing mounting 100 of the screw members. The opposite end of the screw member will be free to move axially through coupling 80 a limited distance toward the upper support 32 of the head frame insuring that the same will not be placed in compression. Thus, in extremely long screw members, a constant tension force is applied to the screw members and compressive forces are prevented so that the elongated screw members will not be stressed in such a manner as to provide sidewise displacement or translational displacement of the same. This will provide for improved accuracy and smoothness in operation of the drive for the drilling head and will eliminate wear on the screw members.

The same effect is produced by upward movement of the drill head on the head frame whenever the drill bits are retracted or in the case of a back reaming operation. Loading on the nuts 55, 56 supporting the drilling head on the head frame will be in a downward direction and the lower end of the screw member 35, 36 will be journaled in such a manner that the thrust bearing will permit axial movement slightly lowering mounting member 115 and separating bearing races 110 placing the force on the screw member in tension. The upper end or driving end of the screw member will be restricted from downward axial movement due to the connection of the coupling member with the upper end of the screw member and the drive shaft loading the screw member in tension to provide the constant tension application of force to the screw member and preventing any sidewise displacement and wear of the same.

It will be recognized that while the particular disclosure herein relates to a ball nut type drive structure and screw member, that the same application could be made with conventional screws and nuts in other apparatus. Thus, the elongated screw member could be a lead screw or nut in a machine tool with the same forces applied thereto.

In considering this invention it should be remembered that the present disclosure is illustrative only and the scope of the invention could be determined by the appended claims.

What is claimed is:

1. A screw drive for a member comprising, an elongated screw member, a support for mounting each end of said screw member, a splined end on one end of said screw member with motor means connected to the splined end for rotating said screw member, a nut mounted on the screw member and mounting the load member to be advanced in either direction along the extent of the screw member with rotation of the screw member by said motor means, and bearing means mounting said screw member on said support, said bearing means including thrust bearing journaling said screw member for rotative movement and means permitting limited axial movement of said screw member.

2. The screw drive of claim 1 in which the thrust bearing means is fixedly secured to the shaft in such a manner as to permit the end of the shaft to which the bearing means is attached to move axially beyond the same.

3. The screw drive of claim 1 in which the means included with the thrust bearings are sleeve bearings which permit the axial movement.

4. The screw drive of claim 1 in which the thrust bearing on at least one end of the screw member is an annular roller bearing with a fixed race attached to the support and secured remote from the end of the screw member and with a movable race attached to the shaft in a position nearest the end of the screw member.

5. The screw drive of claim 4 and including a sleeve bearing means additionally mounted on the screw member and permitting limited axial movement of said movable race of the thrust bearing.

6. The screw drive of claim 4 in which the movable race is mounted in a sliding bearing retainer fixed on said screw member with radial bearing means positioned between the sliding bearing retainer and the support for limited axial movement of the screw member relative to the support.

7. The screw drive of claim 6 in which the movable race of the thrust bearing is secured to the screw member by means of a threaded clamp nut bearing against the sliding bearing retainer and threaded on a threaded extremity of the screw member.

8. The screw drive of claim 1 in which the means permitting axial movement of the screw member is the splined connection at the other end of said screw member coupling the same to the motor means including the thrust bearings for mounting said other end of said screw member.

9. The screw drive of claim 8 and including a thrust transfer collar connected to the motor and engaging a flange on the extremity of the screw member with the splined connections between the screw member and the motor being positioned within the same and allowing for limited axial movement of the screw member in the direction of the motor.

10. A screw drive for a member comprising, an elongated screw member, a support for mounting each end of said screw member, a nut mounted on the screw member and mounting a load member to be advanced in either direction along the extent of the screw member with relative rotation between the screw member and the nut, bearing means mounting said screw member in said support, said bearing means including thrust bearings journaling the screw member for rotative movement and means permitting limited axial movement of the screw member, and means providing a relative movement between the screw member and the nut to advance the load member in either direction along the extent of the screw member.

11. A screw drive for a member comprising, an elongated screw member, a support for mounting each end of said screw member, a nut mounted on the screw member and mounting a load member to be advanced in either direction along the extent of the screw member with relative rotation between the screw member and the nut, bearing means mounting said screw member in said support, said bearing means being fixedly secured to the shaft in such a manner as to permit the end of the shafts to which the bearing means is attached to move axially beyond the same, and means providing a relative movement between the screw member and the nut to advance the load member in either direction along the extent of the screw member.

* * * * *

UNITED STATES PATENT OFFICE
CERTIFICATE OF CORRECTION

Patent No. 3,792,619　　　　　　Dated February 19, 1974

Inventor(s) Robert E. Cannon and Walter L. Pehoski

It is certified that error appears in the above-identified patent and that said Letters Patent are hereby corrected as shown below:

Column 3, line 62, delete 112 and insert the following -122-

Signed and sealed this 11th day of June 1974.

(SEAL)
Attest:

EDWARD M. FLETCHER, JR.
Attesting Officer

C. MARSHALL DANN
Commissioner of Patents